June 30, 1925.

R. S. JURGENS 1,543,925

RADIATOR ATTACHMENT

Filed Feb. 25, 1924

Inventor

Robert S. Jurgens

By Fischer & Lagard

Attorneys

Patented June 30, 1925.

1,543,925

UNITED STATES PATENT OFFICE.

ROBERT S. JURGENS, OF ST. PAUL, MINNESOTA, ASSIGNOR OF ONE-HALF TO JULIUS JURGENS, OF ST. PAUL, MINNESOTA.

RADIATOR ATTACHMENT.

Application filed February 25, 1924. Serial No. 694,964.

*To all whom it may concern:*

Be it known that I, ROBERT S. JURGENS, a citizen of the United States, residing at St. Paul, in the county of Ramsey and State of Minnesota, have invented a new and useful Improvement in Radiator Attachments, of which the following is a specification.

My invention relates to radiator attachments and has for its object to provide an attachment which may be secured to the petcock of a radiator whereby the same may be manipulated in an easy and convenient manner.

Another object of the invention is to provide a device which may be attached to the petcock of a radiator and is adapted to extend outwardly beyond the radiator to an accessible position where the same may be readily manipulated.

Another object of the invention resides in providing a support adapted to be attached to the headlight supporting bracket of a motor vehicle which is adapted to engage and support the outer end of said device.

A still further object of the invention resides in providing a structure which may be secured to an existing petcock without removal or alteration thereof.

Another object of the invention resides in providing a structure whereby the petcock of the radiator is prevented from being accidentally opened through vibrations of the motor vehicle.

The full objects and advantages of my invention will be found in the detailed description thereof and are particularly pointed out in the claims.

In the drawings illustrating my invention in one form,

Figure 1:
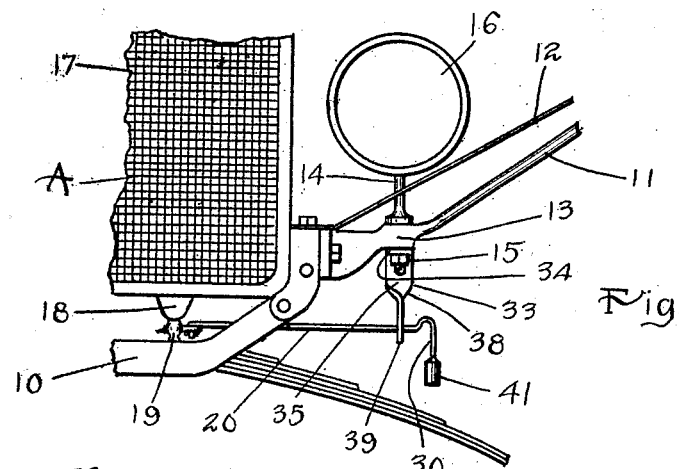
Figure 1 is a front, elevational view of a portion of a motor vehicle illustrating the application of my invention to the radiator thereof.
Figure 2:
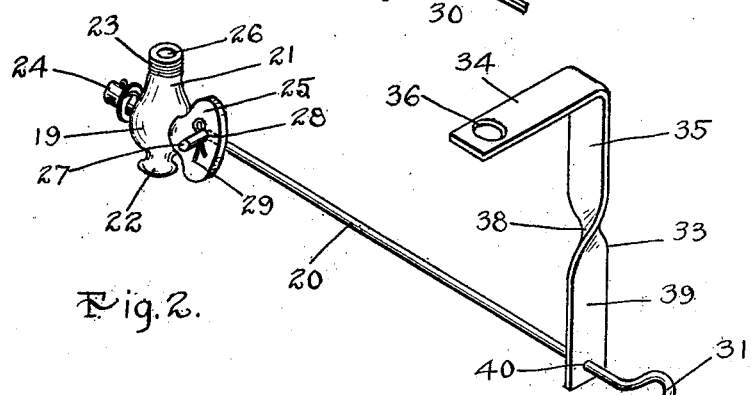
Figure 2 is a perspective view of my invention detached from the radiator and drawn to an enlarged scale.

In the drawings I have illustrated an ordinary type of motor vehicle, though it can readily be understood that the invention may be applied to other types and forms than that illustrated. I have indicated the entire motor vehicle at A of which a portion of the framework 10 is shown, which has rigidly bolted to it a front fender brace 11 supporting the fender 12. This brace is formed wth an enlarged portion 13 which is adapted to carry a headlight bracket 14 passing through said portion 13 and secured thereto by means of a nut 15. This bracket carries a headlight 16 in the usual manner. In addition, the radiator 17 of the motor vehicle A is shown which is formed with a return pipe 18 to the lower portion of which is attached a petcock 19 used for draining the same when the occasion arises. In the ordinary form of motor vehicle the petcock 19 is usually situated in such an awkward and inaccessible position that considerable difficulty is encountered when it is attempted to turn the same to shut off or open the said pet cock for closing or draining the radiator. My invention is so arranged that this petcock may be manipulated from an accessible place in conjunction with a motor vehicle as will presently become apparent.

Figure 4:
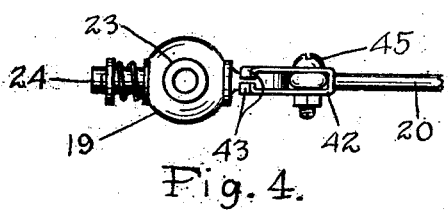
Figure 4 is a plan view of the structure shown in Figure 3.

The petcock 19 as illustrated in detail in Figure 4 may be of ordinary construction having a body portion 21 formed with a discharged nozzle 22 and a neck 23 by means of which the same may be screwed into the member 18 of radiator 17. A conical valve member 24 terminating in a thumb piece 25 is adapted to open or close the passageway 26 extending through the body portion 19. Petcocks of this nature are of ordinary construction and are found to a large extent on most radiators of motor vehicles. My invention is particularly adapted to such petcocks though the same may be easily applied to other devices as used for the same purpose. My invention proper consists primarily of a rod 20 which is formed with an angular lug 27 at the extreme end of the same. This lug passes through an opening 28 in the thumb piece 25 of petcock 19 and is held rigidly in place thereon by means of a cotter pin 29 passing through said lug 27 adjacent the thumb piece 25. With this construction conical valve member 24 may be rotated upon rotating rod 20. For manipulating rod 20 the same is provided at its extreme end with a handle 30 which is preferably bent upwardly to form a loop at 31 and then extends downwardly for a considerable distance below said rod. By means of this construction the thumb may be placed against the portion 31 and the fingers behind the handle 30, whereby the same may be readily and easily turned to manipulate the valve member 24.

For supporting the rod 20 adjacent handle 30 I provide a bracket 33 which is formed with a horizontal arm 34 issuing outwardly from a vertical leg 35. The arm 34 is formed with an opening 36 by means of which the same may be placed upon the lamp supporting bracket 14 and clamped beneath the nut 15 against the portion 13 of brace 11. This arm is of such a length that it brings the center of the vertical leg 35 in alinement with the petcock 19. At about the center of the leg 35 of bracket 33 the same is formed with a quarter twist 38 bringing the lower portion 39 of said bracket at right angles to the rod 20. An opening 40 in the portion 39 serves as a bearing for the end of rod 20 adjacent handle 30, whereby the same is guided so that the handle 30 may be effectively rotated to open and close the petcock 19.

To cause the petcock to remain closed at all times I form the handle 30 considerably longer and of more weight than the looped portion 31 extending above rod 20. With this arrangement the weight of the handle normally tends to hold the handle downwardly and maintain the valve closed. Where the weight of the handle alone is not sufficient to so cause the handle to remain a knob 41 may be secured to the end of said handle which in addition to providing a structure which may be utilized in manipulating the handle, also serves as a weight to hold the handle in the required position. With this arrangement the petcock 19 is always held in closed position so that due to vibration of the vehicle the same cannot become accidentally opened to permit the water in the radiator to escape therefrom.

In installing this form of the invention it is merely necessary to remove the petcock furnished with the motor vehicle radiator and either drill a small hole through the thumb piece thereof or substitute a petcock so drilled, which will be furnished with the device. Upon removal of the nut 15, bracket 33 having the rod 20 passing therethrough may be screwed into place and the lug 27 passed through opening 28 and fastened thereto by the cotter pin 29. After this the device is ready for use.

Figure 3:
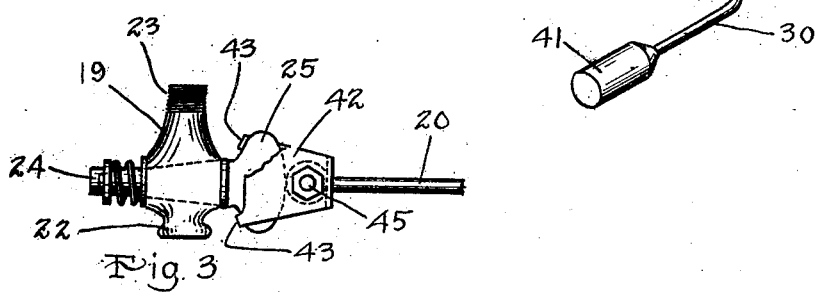
Figure 3 is an elevational view of a petcock showing another method of attaching my invention thereto.

In Figures 3 and 4 I have shown a form of the invention which may be attached to the petcock 19 without drilling the hole 28 therethrough. This construction consists of a U-shaped clip 42 which is adapted to fit over the thumb piece 25. This clip is formed with a number of fingers 43 which fit over the edges of the thumb piece 25 so that when the portions of the clip 42 are clamped together the same grip upon the said thumb piece and hold the structure securely attached thereto. In this form of the invention the rod 20 extends through the clip 42 and is provided at its end with an eye 44 which fits snugly between the sides of said U-shaped clip. A bolt 45 passes through the clip 42 and through the eye 44, serving to clamp the walls of said clip together to engage upon the thumb piece 25 and to hold the rod 20 rigidly secured to said clip. In use the walls of the clip 42 are normally spread and may be readily inserted over the thumb piece 25. Upon tightening the bolt 45 the walls are brought together causing the same to clamp upon eye 44 and thumb piece 25 with the fingers 43 engaging behind the said thumb piece and holding the structure securely attached thereto.

The advantages of my invention are manifest. An extremely simple device is provided which may readily be attached to the radiator of a motor vehicle, whereby the petcock thereof may be effectively and easily manipulated. The device is so arranged that the member to be engaged by the operator for rotating the valve member of the petcock is positioned in a readily accessible portion of the motor vehicle so that considerable convenience is afforded the user when he desires to drain or close the radiator of the motor vehicle. The device is so arranged that the manipulating handle thereof is positioned in a portion of the vehicle where no grease and dirt occurs, so that danger of soiling the hands and clothing of the user of the vehicle is prevented. The device functions to assist in maintaining the valve of the petcock closed so that accidental opening of the same and loss of the water in the radiator is prevented. My invention may be manufactured at a small cost and can be easily and readily installed upon motor vehicles with a minimum amount of expense and effort.

In accordance with the patent statutes I have described my invention, illustrating the best embodiment thereof, but I desire to have it understood that the invention can be carried out by other means and applied to uses other than those above set forth within the scope of the following claim.

I claim:

As an article of manufacture, a radiator drain pet-cock operating means comprising a rod adapted to be pivotally attached to the pet-cock, the opposite end of the rod adapted to be supported by the free end of a bracket, said rod end having a loop and an extension from said loop to receive the thumb and fingers respectively, for opening the pet-cock, and a weight at the extremity of the rod to return the pet-cock to its closed position.

ROBERT S. JURGENS.